(12) United States Patent
Joly-Pottuz et al.

(10) Patent No.: US 8,608,236 B2
(45) Date of Patent: Dec. 17, 2013

(54) FRONT MODULE FOR A MOTOR VEHICLE

(75) Inventors: Pascal Joly-Pottuz, Lenting (DE); Raphael Mary, Stammham (DE)

(73) Assignee: Faurecia Kunststoffe Automobilsysteme GmbH, Ingolstadt (DE)

( * ) Notice: Subject to any disclaimer, the term of this patent is extended or adjusted under 35 U.S.C. 154(b) by 31 days.

(21) Appl. No.: 13/155,103

(22) Filed: Jun. 7, 2011

(65) Prior Publication Data
US 2011/0298248 A1 Dec. 8, 2011

(30) Foreign Application Priority Data
Jun. 8, 2010 (DE) .......... 10 2010 029 789

(51) Int. Cl.
*B62D 25/08* (2006.01)
*B60K 11/04* (2006.01)

(52) U.S. Cl.
USPC ............. 296/193.04; 296/193.09; 180/68.4

(58) Field of Classification Search
USPC ........... 296/203.01, 203.02, 193.09, 193.03, 296/193.04; 180/68.4, 68.6
See application file for complete search history.

(56) References Cited

U.S. PATENT DOCUMENTS

| | | | |
|---|---|---|---|
| 6,497,432 B2 * | 12/2002 | Scheib et al. ................ | 280/779 |
| 6,923,495 B2 * | 8/2005 | Kishikawa et al. ...... | 296/193.09 |
| 7,377,579 B2 * | 5/2008 | Kwon ....................... | 296/193.09 |
| 7,438,348 B2 * | 10/2008 | Nakamae et al. ........ | 296/187.04 |
| 7,497,289 B2 * | 3/2009 | Kwun et al. .............. | 180/68.4 |
| 2006/0156547 A1 * | 7/2006 | Tarahomi ................. | 29/897.2 |

FOREIGN PATENT DOCUMENTS

EP 1612024 A1 1/2006

* cited by examiner

*Primary Examiner* — Dennis Pedder
(74) *Attorney, Agent, or Firm* — Hulsey, P.C.; William N. Hulsey

(57) ABSTRACT

The invention relates to a front module for a motor vehicle, wherein the front module is in one piece and is composed exclusively of plastic.

13 Claims, 4 Drawing Sheets

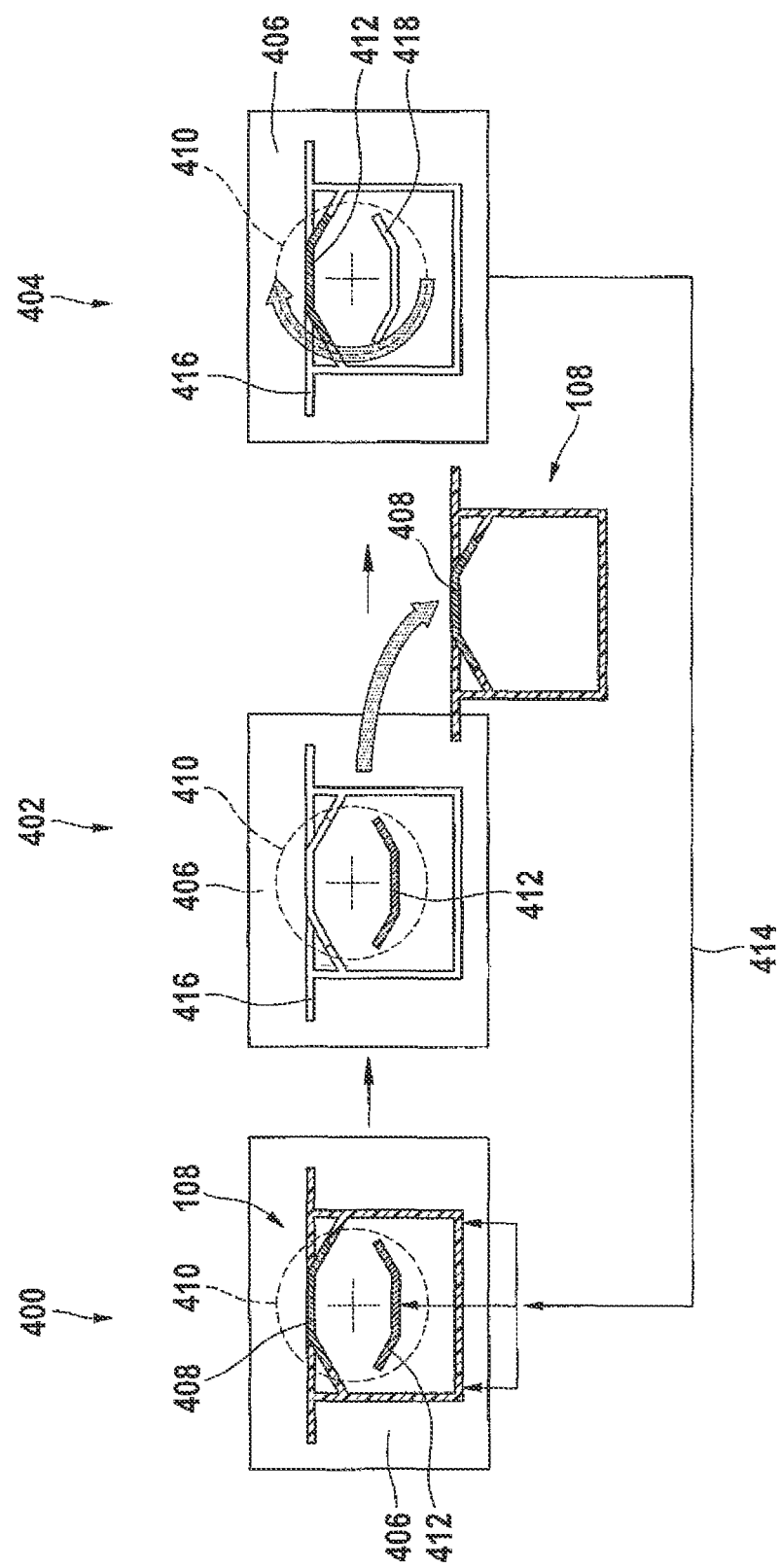

FRONT MODULE FOR A MOTOR VEHICLE

RELATED APPLICATIONS

This application claims priority for German Patent Application #DE10 2010 029 789.5 filed on Jun. 8, 2010 and the same is incorporated herein as if fully set forth.

FIELD OF THE INVENTION

The invention relates to a front module for a motor vehicle and to a method for producing a front module.

BACKGROUND OF THE INVENTION

Generally known from the prior art are front modules for motor vehicles, which front modules are composed entirely of metal. Such front modules have generally been credited with the advantage of having high mechanical stability. A disadvantage of such front modules is however the high weight on account of the use of metal. Furthermore, such front modules must for example additionally be provided, in a complex manner, with corrosion protection, which increases the production costs of corresponding front modules.

Also known from the prior art, for example from EP 1 612 024 A1, are composite components having a carrier component and a covering component composed of plastic and having arranged between said components a reinforcement component composed of metal.

SUMMARY OF THE INVENTION

In contrast, the invention is based on the object of providing a front module for a motor vehicle and also a method for producing a front module.

The objects on which the invention is based are achieved in each case by means of the features of the independent patent claims. Preferred embodiments of the invention are specified in the dependent claims.

A front module for a motor vehicle is specified, wherein the front module is in one piece and is composed exclusively of plastic. Here, use must be made of a high-strength plastic, wherein high mechanical stability of the front module is ensured on account of its being in one piece. Because only plastic is used, it is for example possible to provide any desired shapes and radii of the front module. Complex lacquering for the purpose of providing corrosion protection is likewise dispensed with. Furthermore, a corresponding front module has a significantly lower inherent weight than a front module which additionally has metal. In this way, it is ultimately possible for the overall weight of a vehicle to be reduced, which firstly lowers the energy consumption of the vehicle and secondly results in higher acceleration values of said vehicle for the same drive power.

According to one embodiment of the invention, the front module has a trapezoidal shape with two horizontal support elements which are spaced apart from one another and two vertical support elements which are spaced apart from one another, wherein at least two of the support elements are connected to one another by transverse struts. It is pointed out that, in the invention, the expression "trapezoidal" should not be understood to mean a mathematically exact trapezoidal shape. Said expression should rather be understood to mean that the front module is composed substantially of four sides, wherein said sides, similarly to those of a trapezium, are correspondingly aligned parallel to or inclined with respect to one another. This therefore however also includes embodiments which have, for example with regard to one of said sides, a significantly elongated V-shape or the like.

It is also pointed out that the expressions "horizontal" and "vertical" serve merely for general definition and do not restrict the alignment of the support elements, for example in relation to a vehicle body or generally in relation to a front module.

The use of transverse struts has the advantage that forces acting on the individual support elements can be distributed in an efficient manner over the entire front module. The mechanical stability of the front module is significantly increased in this way.

According to one embodiment of the invention, the upper horizontal support element is connected by the transverse struts to the vertical support element or to the lower horizontal support element. This has the advantage that normally high forces acting on the upper horizontal support element can be dissipated effectively over the entire front module. In this way, the stability of the upper horizontal carrier element need not imperatively be so high that forces acting on said support element can correspondingly be dissipated to the vertical support elements. Although the total mass of the front module is increased as a result of the introduction of the transverse struts, the total weight can however be reduced overall in turn as a result of the weight saving on account of the fact that the horizontal upper support element can be formed with lower stability.

According to a further embodiment of the invention, the support elements are composed of a first plastic and the transverse struts are composed of a second plastic. Here, the first plastic is significantly less strong than the second plastic. This has numerous advantages.

Firstly, this yields a significant cost saving, because high-strength and expensive plastics are used only where correspondingly high forces need to be conducted. As already mentioned above, forces acting in particular on the upper horizontal support element are dissipated via the transverse struts to the front module, such that it is adequate to ensure particularly high stability and stiffness of the transverse struts. A further advantage is attained if the first plastic is a plastic which can be deformed in the event of a collision of a person against the front module. In other words, the use of two plastics of different hardness can therefore serve to provide pedestrian protection.

For example, it may be specified in this regard that, above a collision speed of 30 kilometers per hour of a person against the front module, a deformation of the latter occurs such that, in this way, the collision energy is reduced and furthermore the risk of injury for certain types of injury decreases. In particular, it may be provided for this purpose that the upper horizontal support element is designed especially to provide such pedestrian protection. That is to say, if a pedestrian collides with the engine hood arranged thereabove, the collision energy can be dissipated by the correspondingly regulated deformation of the upper horizontal support element.

According to a further embodiment of the invention, at least one of the support elements has at least a first and a second section, wherein the first section is composed of the first plastic and the second section is composed of the second plastic. In this way, local sections of the front module can be mechanically reinforced. In this way, it is possible for example to make allowance for the fact that forces can act on different sections of the front module in a particularly significant way.

The front module has for example longitudinal support plates, preferably likewise produced from plastic and integrally connected to the front module. Said longitudinal support plates are arranged on the vertical support elements and are provided for fastening the front module to a vehicle body. If in particular the longitudinal support plates are now arranged on the vertical support elements at the level of the connection points between the respective vertical support elements and the transverse struts, a transmission of force from the front module to the vehicle body takes place to a high degree via said longitudinal support plates. If, therefore, the longitudinal support plates and also the regions of the connection points of the respective vertical support elements and the longitudinal support plates are now composed of the second plastic, it is ensured that no deformation of the front module occurs at the stated points on account of the high forces acting. In other words, high strength of the front module is ensured in this way.

It may thus be summarized that, in such an embodiment, the entire front module is monolithic, that is to say in one piece, and is composed exclusively of plastic. Here, said front module notionally comprises both the horizontal and vertical support elements and also the transverse struts and the longitudinal support plates. Such a front module may be produced for example in a two-component injection-moulding process in substantially two working steps, as a result of which a front module can be produced in a cost-effective way. Welding and other methods for connecting individual elements of the front module to one another are therefore dispensed with.

In this connection, it is also pointed out that the present invention is not restricted to the use of only two plastics. It is also possible for more than two types of plastics to be used. For example, the horizontal support elements may be produced from a different plastic material than the vertical support elements. The longitudinal support plates may also have a different plastic material, which makes particular allowance for the high forces acting on the longitudinal support plates.

According to a further embodiment of the invention, the second plastic is encapsulated by injection moulding by the first plastic. Here, "encapsulated by injection moulding" should not be understood restrictively to mean that the second plastic is completely enveloped by the first plastic. It is also possible in principle in this regard for the second plastic to be partially surrounded by the first plastic. This has the advantage that, similarly to the steel reinforcement in a concrete wall, use can be made both of the mechanical properties of the first plastic and also those of the second plastic. For example, if on account of the high mechanical stability the second plastic is more brittle and can be subjected only insufficiently to bending loads, it is possible by means of the combination with the first plastic and the lower mechanical stiffness thereof to profit from the fact that, as a result of the combination, an element is produced which has excellent mechanical properties both under compressive loading and also under bending loading. The overall stability of a correspondingly produced front module is thereby significantly increased.

According to a further embodiment of the invention, the front module also has a receptacle for a lock for a bonnet of a motor vehicle, wherein the receptacle is constructed on the upper horizontal support element. The second section between the connection points of the transverse struts to the upper horizontal support element may for example serve for this purpose. In general, at least one of the support elements has at least a first and a second section, wherein the first section is composed of the first plastic and the second section is composed of the second plastic.

The connection of a receptacle for a lock for a bonnet of a motor vehicle to the upper horizontal support element has the advantage that forces acting on the front module in particular as a result of the closure of an engine hood can be absorbed and distributed over the front module as a whole in an effective manner. Here, if parts of the front module additionally serve for pedestrian protection, the corresponding region of the upper horizontal support element may be designed such that, as described above, corresponding impact energy can be dissipated from the bonnet to the front module, and energy dissipation simultaneously takes place.

In a further aspect, the invention relates to a method for producing a front module as described above by means of a two-component injection-moulding process, wherein the method has the following steps:

a) providing an injection-moulding device having a rotatable drum, wherein the drum has at least two identical mould cores offset with respect to one another,
 b) closing one of the mould cores by means of a first nozzle element, wherein the first nozzle element is designed for the injection of plastic, wherein a first cavity is formed by the mould core closed by means of the first nozzle element and the nozzle element, wherein the mould core which is not closed off remains empty,
 c) injecting the second plastic into the first cavity in order to obtain an injection-moulded part,
 d) opening the mould core containing the injection-moulded part by removing the first nozzle element, wherein the injection-moulded part remains in the mould core,
 e) rotating the drum,
 f) closing the empty mould core by means of the first nozzle element and closing the mould core containing the injection-moulded part by means of a second nozzle element, wherein the second nozzle element is designed for the injection of plastic, and the mould core containing the injection-moulded part, the injection-moulded part and the second nozzle element form a second cavity,
 g) injecting the second plastic into the first cavity in order to obtain a further injection-moulded part, and injecting the first plastic into the second cavity in order to obtain the front module,
 h) opening the mould core containing the front module by removing the second nozzle element, withdrawing the front module from the cavity such that an empty mould core is formed, and repeating steps d-h.

Embodiments of the invention have the advantage that corresponding front modules can be produced in a continuous manner: that is to say, while steps d-h are repeated, production both of the injection-moulded part and also of the front module takes place continuously, wherein the injection-moulded part is integrated in the front module. It is possible in particular to realize a mass production process in this way.

Furthermore, such a method has the advantage that the production of the front module is made possible in a space-saving manner through the use of the rotatable drum. Complex production lines for conveying injection-moulded parts between different cavities are eliminated.

According to a further embodiment of the invention, the injection-moulded part is encapsulated by injection moulding by the first plastic.

According to a further embodiment of the invention, the first and the second nozzle element are movable only in the radial direction of the drum. In other words, the first and second nozzle elements perform only a movement for opening and closing the connection of the first and second cavities. Movements which for example follow the rotation of the drum thereby become unnecessary, whereby in other words the first and second nozzle elements can be designed to be substantially positionally fixed. A cumbersome movement of the nozzle element in a corresponding injection-moulding device is then not necessary. This simplifies the structural design of a corresponding injection-moulding device.

These and other aspects of the disclosed subject matter, as well as additional novel features, will be apparent from the description provided herein. The intent of this summary is not to be a comprehensive description of the claimed subject matter, but rather to provide a short overview of some of the subject matter's functionality. Other systems, methods, features and advantages here provided will become apparent to one with skill in the art upon examination of the following FIGUREs and detailed description. It is intended that all such additional systems, methods, features and advantages that are included within this description, be within the scope of any claims filed later.

BRIEF DESCRIPTION OF THE FIGURES

Preferred embodiments of the invention will be explained in more detail below with reference to the drawings, in which:

FIG. 4 shows a schematic illustration of method steps for producing a front module as described above.

DETAILED DESCRIPTION OF ILLUSTRATIVE EMBODIMENTS

Figure 1:
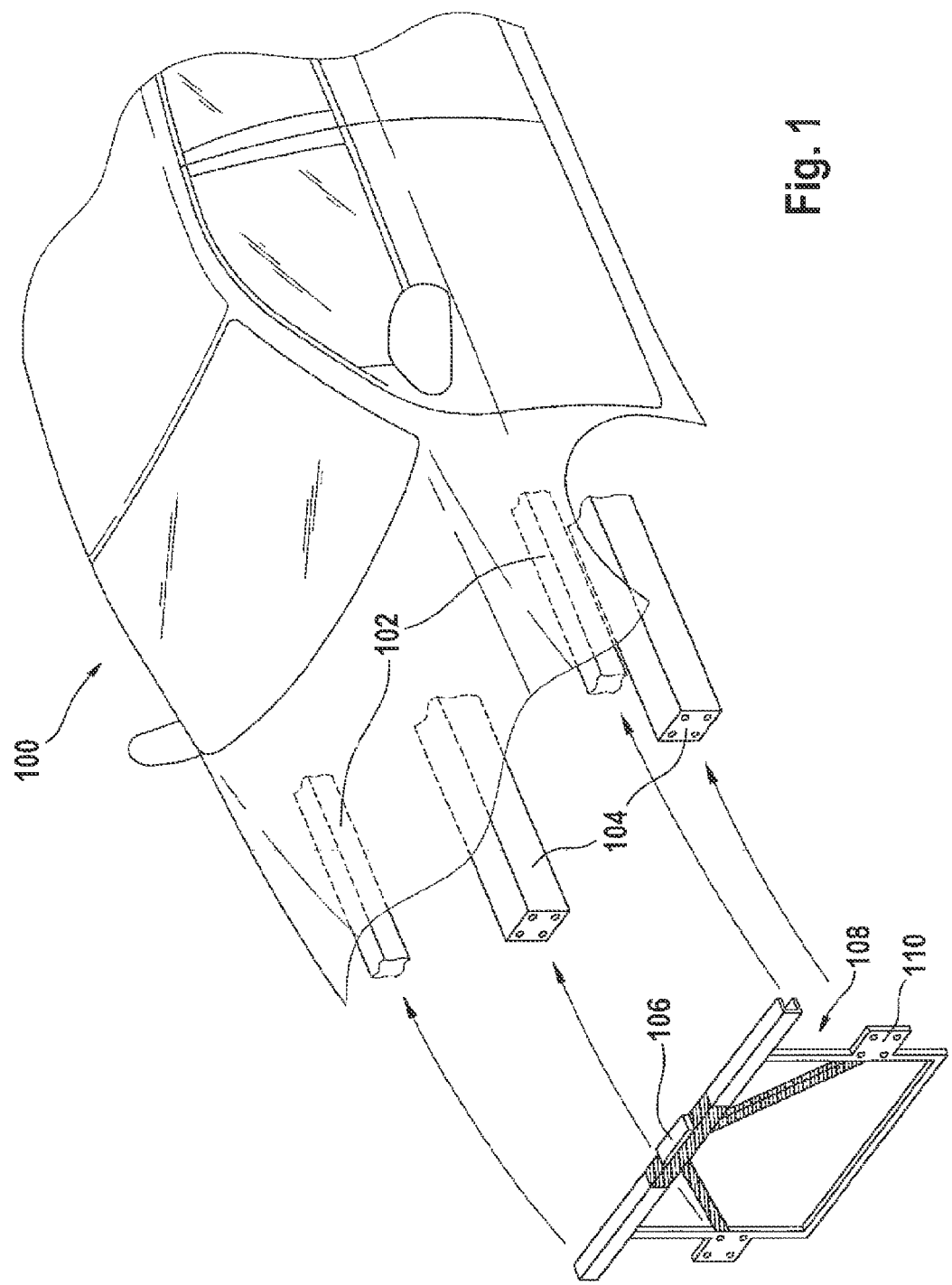
FIG. 1 shows a schematic view of a motor vehicle having a front module.

Below, elements which correspond to one another in the embodiments below are denoted by the same reference numerals.

FIG. 1 shows a schematic view of a motor vehicle 100 having a front module 108. The motor vehicle 100 has a body which has inter alia a mudguard support 102 and an engine support 104.

For the fastening of the front module 108, it has longitudinal support plates 110. Said longitudinal support plates 110 may for example be screwed, as sketched in FIG. 1, or fastened generally to the engine support 104.

Also shown in FIG. 1 is a receptacle 106 for a lock for a bonnet of the motor vehicle 100. This will however be discussed in detail further below with reference to FIG. 3.

Figure 2:
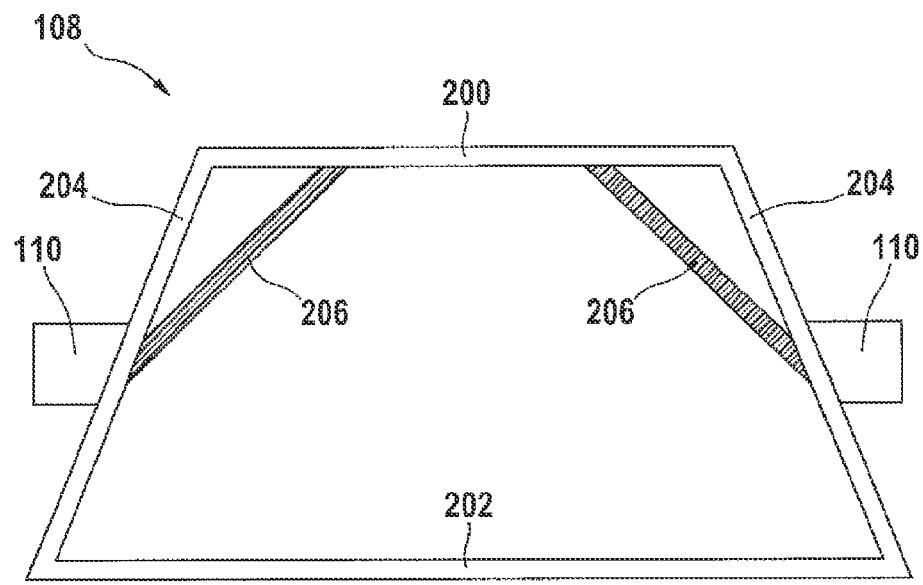
FIG. 2 shows a schematic view of a front module.

FIG. 2 shows a schematic view of a front module 108. All the elements of the front module 108 shown in FIG. 2 are formed in one piece with one another and consist exclusively of plastic. The front module 108 has a trapezoidal shape with two horizontal support elements 200 and 202 which are spaced apart from one another and two vertical support elements 204 which are spaced apart from one another. The upper horizontal support element 200 and the vertical support elements 204 are connected to one another by transverse struts 206. Here, the transverse struts 206 consist of a plastic material which has a higher strength than the plastic material used for the support elements 200, 202 and 204.

The front module 108 also has two longitudinal support plates 110. Said longitudinal support plates 110 are arranged on the vertical support elements 204 and serve, as described above, for fastening the front module to a vehicle body (cf. FIG. 1). Here, the longitudinal support plates 110 are arranged on the vertical support elements 204 at the level of the connection points between the respective vertical support elements 204 and the transverse struts 206.

Figure 3:
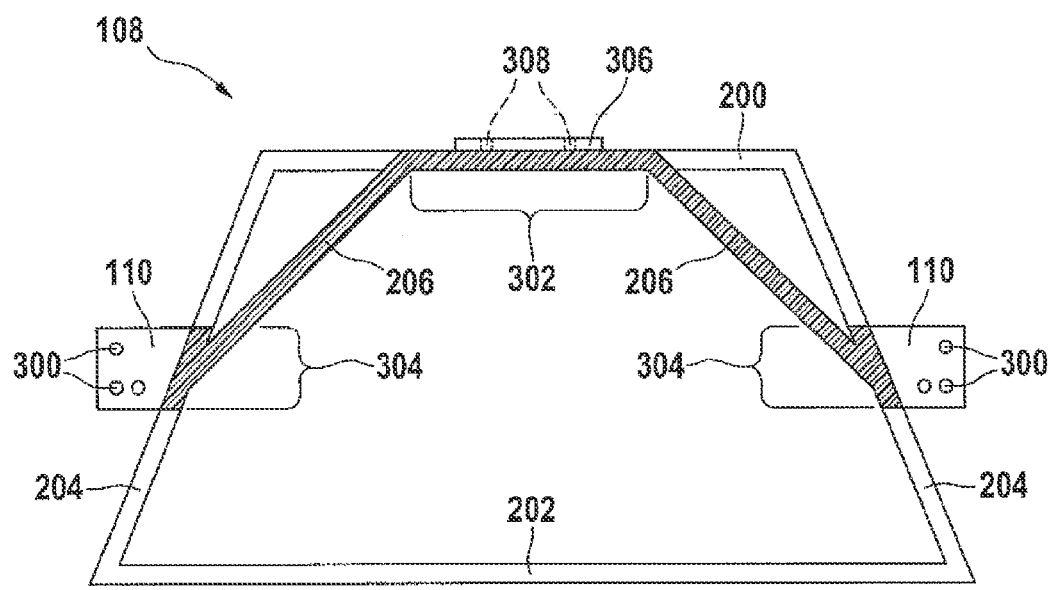
FIG. 3 shows a schematic view of a front module.

FIG. 3 shows a further embodiment of a front module 108 in a schematic illustration. In the same way as the front module described with regard to FIG. 2, the front module 108 in FIG. 3 also has a trapezoidal shape, wherein all of the elements illustrated in FIG. 3 are formed in one piece with one another and consist exclusively of plastic, that is to say in particular do not have metal reinforcements. In contrast to FIG. 2, the upper horizontal support element 200 and the vertical support elements 204 have different sections. With regard to the support element 200, in section 302 between the connection points of the transverse struts 206 to the upper horizontal support element 200, use is made of a plastic which has the same material as that used for the transverse struts 206. The vertical support elements 204 have a region 304, wherein said region 304 is formed between the areal connection points (connection sections) of the respective vertical support elements 204 and the longitudinal support plates 110. Said regions 304 are also produced from the high-strength plastic material used for the transverse struts 206.

The front module 108 therefore consists, overall, of two plastic components, specifically a high-strength plastic component for the regions 304 and 302 and the transverse struts, and also a plastic component of lower hardness for the other support elements 200, 202 and 204.

If for example high forces now act on the region 302, no deformation takes place in said region and said forces are dissipated in an effective manner via the transverse struts 206 and the region 304 to the longitudinal support plates 110.

Also indicated in FIG. 3 are cutouts 300 which serve for the lead through of fastening means for fixing the longitudinal support plates on the vehicle body (cf. FIG. 1). It is however pointed out that parts of the front module 108 may have further cutouts, for example also with an integrated plastic thread. If such cutouts are provided on high-strength regions of the front module 108, these may be used for receiving fastening means for the retention of further vehicle elements. Conceivable here would be the retention of for example different fluid containers such as containers for washer fluids, brake fluids or the like.

Also shown in FIG. 3 is a receptacle 306 with cutouts 308. Said receptacle 306 serves for receiving and fastening a lock of a bonnet. The lock can be fixed to the front module 108 via the cutouts 308. Since the receptacle 306 is situated in the high-strength region 302 of the front module 108, it is ensured that forces acting on the front module 108 for example during the closure of the bonnet do not lead to a deformation of the front module 108. It is pointed out here that both the region 302 and also the receptacle 306 are illustrated on an over dimensioned scale in FIG. 3. This however serves merely for illustrative purposes. In reality, said regions will be significantly narrower so as to ensure that, to the sides of said regions, forces acting on the support element 200 can lead to a targeted deformation of the support element. As described above, this serves for example for pedestrian protection. It is nevertheless possible in a cheap manner to provide a lightweight and highly stable front module.

FIG. 4 schematically shows different method steps for producing a front module as described above using for example a two-component injection-moulding process. Here, the process is carried out by means of a device 406. The device 406 has a rotatable drum 410, wherein said drum has two identical mould cores offset with respect to one another by 180°. Said mould cores are not illustrated in any more detail in FIG. 4. In step 400, both an injection-moulded part 412 consisting of a high-strength plastic and also a front module 108 have already been produced in a preceding cycle using said mould cores, wherein said front module 108 partially has a further injection-moulded part of high mechanical strength and otherwise has a plastic which has a lower strength of the plastic of the injection-moulded part.

In step 402, the removal of the finished front module 108 firstly takes place, wherein the two components of the front module can now be clearly seen—specifically firstly the component 408 corresponding to the injection-moulded part of high mechanical strength and the horizontal and vertical support elements consisting of a plastic of low strength. The front module obtained in this way may for example thereupon be equipped for use in a motor vehicle.

In a step 404 after step 402, the rotatable drum 410 is rotated through 180°. As a result, the injection-moulded part 412 situated in the corresponding mould core comes to rest in the position shown in step 404. If the mould cores are now closed off by means of corresponding nozzle elements, cavities 416 and 418 are formed in this way, as schematically illustrated in FIG. 4. Here, a part of the cavity 416 is the injection-moulded part 412. The cavity 418, in contrast, is completely empty, because the injection-moulded part 408 previously situated therein was extracted, together with the finished front module 108, in step 402.

In step 414, the method returns to step 400, in which an injection takes place into the cavities 416 and 418. In this way, firstly the empty cavity 418 is completely filled with the high-strength plastic in order to form a new injection-moulded part 412. Furthermore, the injection-moulded part 412 shown with regard to step 404 is encapsulated by injection moulding by a plastic of lower strength, such that here, a front module 108 is newly formed in the cavity 416. For better understandability, at the transition from step 404 to step 400 via step 414, the injection-moulded part 412 to be encapsulated by injection moulding was re-designated as an injection-moulded part with the reference numeral 408.

In step 400, the method starts again from the beginning:
removing the two nozzle elements in order to release the newly produced injection-moulded part 412 and the newly produced front module 108,
removing the front module 108,
rotating the drum 410 through 180°,
closing the mould core 418, which has been freed up as a result of the removal of the front module, at the nozzle element in order to form a cavity,
closing the mould core, which contains the injection-moulded part 412, by means of a nozzle element in order to form a further cavity 416,
filling the cavity 418 with the high-strength plastic by injection and filling the cavity 416 with the lower-strength plastic by injection.

Said method is carried out cyclically.

Figure 5A:
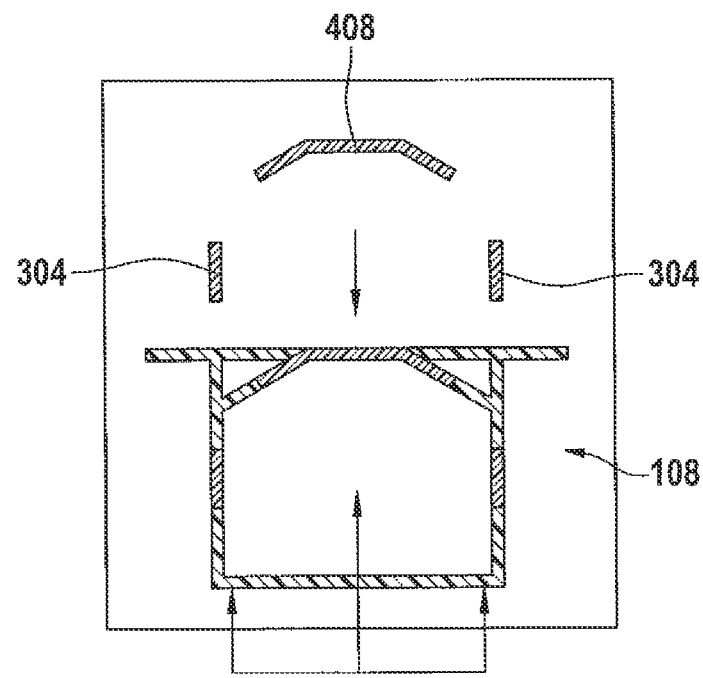
FIG. 5a shows a schematic illustration of method steps for producing a further embodiment of a front module as described above.

FIG. 5 shows a comparison of a conventional production process (FIG. 5a) and the production process of FIG. 4 for producing a front module as described above using for example a two-component injection-moulding process. Here, in contrast to FIG. 4, reinforcement regions 304 (cf. FIG. 3) are additionally provided on the vertical support elements of the front module 108.

Conventionally (FIG. 5a), it was necessary for this purpose for the injection-moulded part 408 and the reinforcement regions 304 to be produced separately from the high-strength plastic, inserted into a corresponding cavity by robot means, and thereupon encapsulated by injection moulding by the plastic of lower strength. The finished front module thereby obtained (not shown in FIG. 5a) subsequently had to be removed again from the die.

Figure 5B:
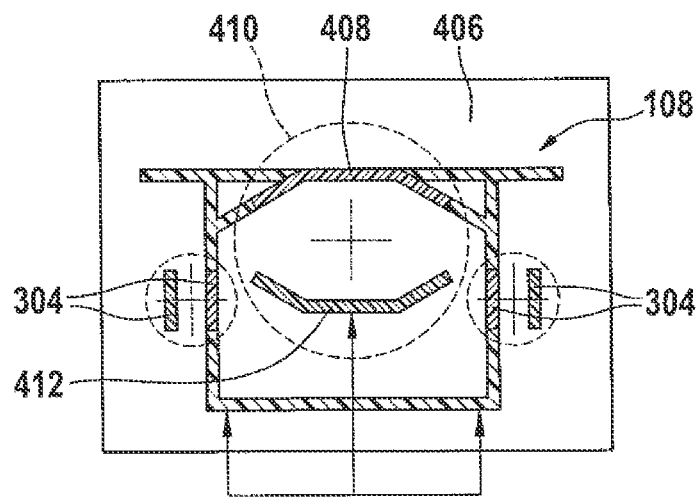
FIG. 5b shows a schematic illustration of method steps for producing a further embodiment of a front module as described above.

In contrast thereto, the method shown in FIGS. 4 and 5b eliminates the need for parts to be removed from dies and placed into other dies by robot means. In the case of FIG. 5b, in contrast to the method explained in FIG. 4, rotatable special cavities are provided which permit the production of vertical reinforcement regions 304, which can thereupon be encapsulated by injection moulding by the plastic of lower strength. In this respect, the method explained in FIG. 4 also permits the addition, section by section, of reinforcements using special cavities. Said embodiment of the invention is particularly advantageous because, in this way, reinforcement regions can be formed at a plurality of locations on the front module with little production outlay by virtue of said reinforcement regions initially being produced in the special cavities and then, in the next step, being introduced by means of a rotational movement into the main cavity for encapsulation by injection moulding.

LIST OF REFERENCE NUMERALS

100 Motor vehicle
102 Mudguard support
104 Engine support
106 Lock receptacle
108 Front module
110 Longitudinal support plate
200 Upper horizontal support element
202 Lower horizontal support element
204 Vertical support element
206 Transverse strut
300 Cutout
302 Reinforced region
304 Reinforced region
306 Lock receptacle
308 Cutout
400 Step
402 Step
404 Step
414 Step
406 Injection-moulding device
408 Injection-moulded part
410 Drum
412 Injection-moulded part
416 Cavity
418 Cavity

What is claimed is:

1. An apparatus for a motor vehicle, wherein the apparatus comprises:
a front module in one piece and composed exclusively of plastic, wherein the front module has a trapezoidal shape, the front module further comprising:
two horizontal support elements which are spaced apart from one another, wherein at least one of the two horizontal support elements is an upper horizontal support element;
two vertical support elements which are spaced apart from one another, wherein at least two of the support elements are connected to one another by transverse struts, wherein the support elements are comprised of a first plastic and the transverse struts are comprised of a second plastic, wherein the first plastic is significantly less strong than the second plastic;
at least two longitudinal support plates, wherein the longitudinal support plates are arranged on the vertical support elements and are provided for attaching the front module to a vehicle bodywork, wherein the longitudinal support plates are arranged at the level of the connection points between the respective vertical support elements and the transverse struts on the vertical support elements.

2. The apparatus according to claim 1, wherein the upper horizontal support element is connected by the transverse struts to the vertical support elements.

3. The apparatus according to claim 1, wherein at least one of the support elements has at least a first section and a second section, wherein the first section is comprised of the first plastic and the second section is comprised of the second plastic.

4. The apparatus according to claim 3, wherein at least the upper horizontal support element has the first section and the second section, wherein the second section is formed between the connection points of the transverse struts to the upper horizontal support element.

5. The apparatus according to claim 1, wherein at least the vertical support elements have a first section and a second section, wherein the second section is formed between the connection points of the respective vertical support elements and the longitudinal support plates.

6. The apparatus according to claim 1, additionally having a receptacle for a lock for a bonnet of the motor vehicle, wherein the receptacle is constructed on the upper horizontal support element.

7. The apparatus according to claim 1, wherein the first plastic is a plastic which can be deformed when something impacts against the front module.

8. The apparatus according to claim 2, additionally having a receptacle for a lock for a bonnet of the motor vehicle, wherein the receptacle is constructed on the upper horizontal support element.

9. The apparatus according to claim 3, additionally having a receptacle for a lock for a bonnet of the motor vehicle, wherein the receptacle is constructed on the upper horizontal support element.

10. The apparatus according to claim 4, additionally having a receptacle for a lock for a bonnet of the motor vehicle, wherein the receptacle is constructed on the upper horizontal support element.

11. The apparatus according to claim 2, wherein the first plastic is a plastic which can be deformed when a person impacts against the front module.

12. The apparatus according to claim 3, wherein the first plastic is a plastic which can be deformed when a person impacts against the front module.

13. The apparatus according to claim 6, wherein the first plastic is a plastic which can be deformed when a person impacts against the front module.

\* \* \* \* \*